United States Patent Office 2,831,898
Patented Apr. 22, 1958

2,831,898

PHENOL ALKYLATION PROCESS

George G. Ecke, Ferndale, and Alfred J. Kolka, Birmingham, Mich., assignors to Ethyl Corporation, New York, N. Y., a corporation of Delaware No Drawing. Application April 29, 1954
Serial No. 426,556

18 Claims. (Cl. 260—624)

This process relates to a method of introducing organic groups onto the nuclear ring of phenols. More particularly, this invention relates to the introduction of organic groups onto the aromatic ring of phenols in a position ortho to the OH group, and to new compositions of matter obtained thereby.

In the past, substituents have been introduced onto the ring of aromatic compounds in a number of ways. One method known to the art is the Friedel-Crafts alkylation whereby an aromatic compound is reacted with a halogenated aliphatic hydrocarbon in the presence of aluminum chloride. By this method one or more alkyl groups are introduced at various positions on the ring. One difficulty experienced when using this process is that the alkylation is nonspecific in that a distribution of the various alkylated isomers is obtained. Another difficulty experienced with Friedel-Crafts alkylation is the rearrangement of the carbon skeleton when branched chain hydrocarbons are introduced. Also, cleavage of highly branched long chain hydrocarbons often occurs. When groups other than alkyl are desired on the aromatic ring, a round-about method of synthesis must be resorted to. It is evident, therefore, that a need exists for a method of introducing organic groups into specific positions on the nuclear portion of phenols which will result in a product that is not contaminated by substances produced due to side reactions or rearrangements.

It is, therefore, an object of this invention to provide a process for the introduction of organic groups onto the nuclear ring of phenols. It is a further object of this invention to provide a process for introducing groups onto the aromatic ring of phenols comprising reacting a phenol with a compound possessing one or more units of carbon-to-carbon unsaturation in the presence of a phenoxide catalyst. It is also an object of the present invention to provide a new compositions of matter described more fully hereinbelow.

Broadly speaking, the objects of this invention are accomplished by reacting an organic compound possessing carbon-to-carbon unsaturation with a phenol having a hydrogen on a carbon atom ortho to the hydroxy group, in the presence of a phenoxide catalyst. One decided advantage obtained by utilizing the process of our invention is that substituents can be selectively introduced onto the aromatic ring in the position ortho to the OH group. By a careful selection of the reactive conditions, predominantly ortho substitution can be obtained. In a number of cases the ortho substituted product is obtained to the exclusion of all other isomers. Thus, our process gives a direct route for the synthesis of many desirable chemicals, many of which are not obtainable in the pure state by means known heretofore. The phenols that can be used in our process can be mono- or poly-nuclear, and also mono- or poly-hydroxy, as for example, hydroxy benzenes, hydroxy anthracenes, hydroxy naphthalenes, hydroxy phenanthrenes, and the like. The phenol used can also have other substituents on the aromatic ring. Illustrative examples of such phenols are given hereinbelow. Of the various phenols, we prefer to utilize those possessing one, two or three condensed rings in the nuclear portion of the molecule. In particular, we prefer to use hydroxy benzenes as one of our reactants.

The unsaturated compound which is reacted with the phenol can be an acetylene, substituted acetylene, mono- or poly-olefins (including mixtures of olefins), cyclo-olefins, aryl substituted olefins, and halogen substituted olefins. Other compounds bearing carbon-to-carbon double or triple bonds that can be used are unsaturated alcohols, amines, esters, ethers, and the like. We prefer to use organic compounds possessing carbon-to-carbon unsaturation having from two to about twenty carbon atoms. Of the various possible unsaturated compounds we prefer to use acetylenic and olefinic hydrocarbons. Of the olefins we prefer those of lower molecular weight, as for example, ethylene, propylene, the various butylenes, and the like, up to olefins containing about twelve carbon atoms such as dodecene, although olefins of higher molecular weight up to and including those containing about twenty carbon atoms such as eicosene can also be used.

As catalyst in the process of this invention, metal phenolates generally are applicable as well as the phenoxy derivatives of phosphorus and arsenic. This includes the phenoxy derivatives of such elements as Al, Mg, Fe, Zn, P, As, Sb, Bi, Sn, and the like. Of these we prefer to make use of the phenoxy derivatives of aluminum and of magnesium. Generally, it has been found that aluminum phenolate lends itself to producing a faster reaction rate in the process of our invention, although magnesium phenolate has been found to be advantageous in obtaining a purer product when reacting certain specific unsaturated organic compounds with phenols as will be illustrated in the examples given below. Mixtures of the phenoxy derivatives of the elements described above can also be used. The phenolate portion of the catalyst molecule can be the same as or different from the phenol that is being alkylated or onto the aromatic portion of which an organic group is being introduced. In general, the catalyst can be prepared from any of the phenols that can be used in our process as mentioned hereinabove. It is necessary only to observe the precaution of choosing that catalyst or catalysts which do not react adversely with the reagents employed.

The catalyst can be prepared in a number of ways. One method is to react a phenol directly with the element to form the phenoxide of that element. Another method is to react a phenol with a derivative of an acid which is weaker than the phenol, wherein the element of which the weaker acid derivative is made, is one of the elements of which the catalyst is to comprise. Still another method of preparing the catalyst is to react a salt of a phenol such as sodium phenoxide with the halide of the desired element such as $AlCl_3$, $AlBr_3$, $AlBr_3$, $PCl_3$, etc. While the catalyst can be prepared by any of the above outlined methods, we prefer to prepare said catalyst by reacting a phenol directly with the desired element or with an acid salt of that element wherein the acid comprising the salt is a weaker acid than the phenol. Of the above methods we prefer the direct preparation of the catalyst by reacting a phenol with the element desired.

The catalyst can be preformed or prepared in situ. However, there are certain advantages in utilizing a preformed catalyst. One such advantage is that there is no hydrogen given off during the course of the substitution reaction. Another advantage of using a preformed catalyst is that greater partial pressures of gaseous reactants can be obtained since no volume is taken up by the liberated hydrogen. Therefore, while the catalyst can be prepared in situ and in some cases there is no objection to so doing, in general we prefer to prepare the catalyst prior to the addition of the substitution agent.

The amount of catalyst used is dependent to some extent upon the pressure at which the reaction is conducted, the reactivity of the reagents and the activity of the catalyst. At higher pressures somewhat smaller amounts of catalysts can be used than are preferable at lower temperatures. Generally, the amount of phenoxide catalyst used should be between about 0.01 and 30 percent by weight of the amount of phenolic reagent used. We prefer to employ from about 1.00 to about 25 percent of catalyst based on the weight of the phenol used as it is found that this amount of catalyst produces a satisfactory rate of reaction. However, greater amounts of catalyst can be used.

In utilizing the novel process of this invention we have been able to obtain new compositions of matter. This has become possible due to the ease with which organic substituents can be introduced in the ortho position of the aromatic ring of phenols by our process. For example, 2,6-di-isopropylphenol was easily prepared by the present process and it was found that this compound possesses properties which distinguish it from its closely related neighbors. To illustrate, 2,6-diethylphenol has a melting point of 35° C., and 2,6-dibutylphenol melts at 37° C., while our new compound, 2,6-di-isopropylphenol, is a clear colorless liquid melting at 18° C., which is below the melting point expected. This new compound is, among other things, a good germicide and antioxidant and, because of its normally liquid state, has important handling advantages.

A new class of compounds synthesized by utilizing the present process has the formula

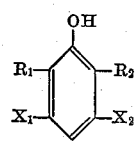

where $R_1$ and $R_2$ can be the same or different and can be halogenated hydrocarbon groups containing two or more carbon atoms; or they can be secondary or tertiary alkyl or cyclo alkyl groups which can have aryl substituents, or cyclo- or substituted cyclo-aliphatic groups thereon, wherein the total number of carbon atoms in each R group is not less than eight. The X's can be the same or different and can be hydrogen, halogen, —OR, —NH$_2$, —NO$_2$, and —COOR′, where R′ is a hydrocarbon group containing from 1 to about 20 carbon atoms. Compounds of this class, having secondary or tertiary groups of the kind described herein in the two positions ortho to the hydroxy group, have superior germicidal and insecticidal properties. Also, because of their vastly increased solubility they serve as superior antioxidants in hydrocarbon fuels and lubricants, as well as antioxidants for rubber compositions. Another use of this class of compounds is as plasticizers and resin ingredients. Compounds can be prepared by reacting a phenol with an organic compound possessing carbon-to-carbon unsaturation in the presence of a phenoxide catalyst. Illustrative examples of the product compounds of this class are: 2,6-di(2-octyl)phenol obtained by the reaction of phenol with 1-octene in the presence of a phenoxide catalyst, 2,6-di(2-dodecyl)-3-chlorophenol obtained by the reaction of 3-chlorophenol with 1-dodecene in the presence of a phenoxide catalyst, 2-(2-octyl)-6-(2-decyl)-3-chlorophenol obtained by first reacting 3-chlorophenol with 1-octene in the presence of a phenoxide catalyst to produce 2(2-octyl)-3-chlorophenol which is then reacted with 1-decene in the presence of a phenoxide catalyst such as aluminum phenoxide.

Another new class of compounds synthesized by our process has the formula

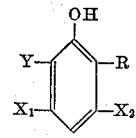

where Y is a halogen and R is an ethyl group or a secondary or tertiary hydrocarbon group having from 3 to about 20 carbon atoms which may or may not have a halogen substituent thereon. The X's can be the same or different and can be hydrogen, halogen, —OR, —NH$_2$, —NO$_2$, and —COOR′, where R′ is a hydrocarbon group containing from 1 to about 20 carbon atoms. The compounds can be prepared by reacting an ortho halo phenol which may or may not have other substituents in the 3 and 5 positions with an organic compound possessing carbon-to-carbon unsaturation. The compounds of this class are found to have enhanced germicidal activity as well as being very good insecticides. These compounds are also found to be very good antioxidants for gasolines and other hydrocarbon fuels as well as for lubricating oils. The outstanding properties of the compounds of this class make them suitable for use as resin components, plasticizers, and as polymer ingredients. Illustrative examples of the product compounds of this class are; 2-ethyl-6-chlorophenol obtained by the reaction of o-chlorophenol with ethylene in the presence of a phenoxide catalyst such as aluminum o-chlorophenoxide, 2-bromo-6-isopropylphenol obtained by the reaction of o-bromophenol with propylene in the presence of a phenoxide catalyst, 2-tert-butyl-3-methoxy-6-chlorophenol obtained by the reaction of 3-methoxy-6-chlorophenol with iso-butylene in the presence of a phenoxide catalyst such as, for example, aluminum 3-methoxy-6-chlorophenoxide.

Still another new class of compound which is obtained by our process has the formula

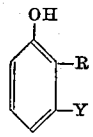

where Y is a halogen such as chlorine, fluorine, bromine or iodine, and R is an ethyl group, or a secondary or tertiary hydrocarbon group having from 3 to about 20 carbon atoms. The compounds of this class can be prepared by reacting m-halo phenols such as m-chlorophenol, m-bromophenol, m-iodophenol or m-fluorophenol with a hydrocarbon possessing carbon-to-carbon olefinic unsaturation. Compounds of this class are found to have enhanced germicidal acitivy as well as being very good insecticides. These compounds are also found to be very good antioxidants for gasolines and other hydrocarbon fuels as well as for lubricating oils. The outstanding properties of the compounds of this class make them suitable for use as resin components, plasticizers and polymer ingredients. Illustrative examples of the product compounds of this class are; 2-ethyl-3-chlorophenol obtained by the reaction of m-chlorophenol with ethylene in the presence of a phenoxide catalyst such as aluminum m-chloro phenoxide, 2-isopropyl-3-bromophenol obtained by the reaction of m-bromophenol with propylene in the presence of a phenoxide catalyst such as magnesium m-bromophenoxide, 2(2-octyl)-3-fluorophenol obtained by the reaction of m-fluorophenol with octene-1 in the presence of a phenoxide catalyst such as antimony m-fluorophenoxide, 2(2-eicosyl)-3-chlorophenol obtained by the reaction of eicosene-1 with m-chlorophenol in the presence of a phenoxide catalyst such as iron m-chloro phenoxide.

Various polymeric substances can be prepared by the process of this invention by reacting phenols substituted with organic groups possessing carbon-to-carbon unsaturation in the presence of a catalyst of the type described hereinbefore. For example, when anol $$(HOC_6H_4CH=CHCH_3 \; (1,4))$$

is reacted with itself in the presence of aluminum anolate, ortho substitution of the anol occurs and the process of such substitution can continue until two, three or more molecules of anol have been condensed to form one unit. The result is a new polymer possessing novel and interesting properties. Non-limiting examples of phenols that can be polymerized in this manner are anol, eugenol $$(HOC_6H_3(OCH_3)CH_2CH=CH_2(1,2,4))$$

isoeugenol and the like.

In addition to polymers of the above kinds, it is also possible to obtain polymers by the reaction of phenols with acetylenes and acetylenic compounds. An illustrative example is the reaction of phenol with acetylene in the presence of a phenoxide catalyst such as aluminum phenoxide. In this case the acetylene reacts with the phenol to form o-hydroxy styrene which then can react further with another molecule of phenol to form 1,1-di(2-hydroxy phenyl)ethane. This product can further react with another molecule of acetylene followed by another molecule of phenol, and so on, to form a linear polymer chain.

In general, the process of our invention is carried out by reacting a phenol, such as hydroxy benzene, with an organic group possessing carbon-to-carbon unsaturation, such as ethylene, in the presence of a phenoxide such as aluminum phenoxide to produce ortho substituted phenols. When an olefin is used, the process can be referred to as an alkylation process, and when ethylene is the alkylating agent, the reaction should be conducted at elevated pressures in order to obtain a sufficient concentration of the gaseous reactant to produce a practical rate of reaction.

The invention will be more fully understood by reference to the following set of illustrative examples in which the percent conversion is calculated on the basis of the amount of phenol charged to the reaction vessel, and the percent yield is calculated on the basis of the amount of phenol unrecovered at the end of the reaction.

EXAMPLE I

*Alkylation of phenol with ethylene (aluminum phenoxide catalyst)*

*Preparation of the catalyst.*—A reaction vessel equipped with means for charging and discharging of liquids and solids, and having a number of gas inlet and outlet lines, temperature measuring devices, means for refluxing liquids, and fitted with a mechanical agitator, was flushed with nitrogen at an elevated temperature in order that all oxygen and moisture be removed from the vessel. While maintaining the flow of nitrogen, there was added to this vessel 300 parts of phenol. The flow of nitrogen continued during the following steps. The temperature of the phenol was raised to 165° C. and then 4.5 parts of aluminum turnings were added in small increments. The reaction was very vigorous and accompanied by a rapid evolution of hydrogen. Agitation was maintained during the reaction which lasted for fifteen minutes. When the reaction had ceased the mixture was allowed to cool to about 60° C. and the agitation discontinued. At this point, the aluminum phenoxide catalyst mixture was ready for charging to the pressure resistant vessel for the next step in the synthesis.

*Ortho-ethyl phenol.*—A pressure resistant vessel having a removable cap for charging and discharging liquids and solids equipped with a plurality of gas inlet and outlet lines, temperature measuring devices, pressure gauges, and fitted with a mechanical agitator was flushed with nitrogen and charged with the aluminum phenoxide catalyst mixture described above without exposure to the atmosphere. A flow of nitrogen was maintained through the pressure resistant vessel and also through the vessel containing the catalyst during the period that said catalyst was being transferred in order that the mixture be not exposed to oxygen of the air. The flow of nitrogen is purely a precautionary measure to prevent any possible partial oxidation of the catalyst prepared from certain of the elements discussed hereinabove.

The pressure resistant vessel was next charged with an additional 300 parts of phenol, the vessel clamped shut and the flow of nitrogen discontinued. The reaction vessel was then heated to 200° C. and pressurized to 21 atmospheres with ethylene. The reaction mixture was further heated and at a temperature of 280° C. a pressure drop indicated the commencement of reaction. At this point, the vessel was further pressurized with ethylene to 55 atmospheres. As the reaction proceeded and the pressure slowly dropped, more ethylene was admitted to keep the pressure in the vessel within the range of 41–55 atmospheres. A total pressure drop of 140 atmospheres was observed in a ten-hour period. At the end of this time the heating was discontinued and the pressure resistant vessel and its contents alowed to cool. When the temperature had reached 25° C., 250 parts of water were added to hydrolyze the catalyst. The contents were withdrawn from the reaction vessel and the aqueous layer discarded. The product was filtered, dried by azeotropic distillation with toluene, and then subjected to fractional distillation to yield 189 parts of o-ethylphenol (24.3 percent conversion, 42.5 percent yield), boiling at 201–203° C. (literature, 201–203° C.); 79 parts of 2,6-diethylphenol (8.3 percent conversion, 14.5 percent yield), boiling at 219° C. and having a melting point of 37–38° C. (literature, 37.5° C.). A minor amount of phenetole and a few parts of a higher boiling fraction were also recovered. An aryl-oxyacetic acid derivative of o-ethylphenol had a melting point of 138–140° C. (literature, 140°–141° C.). The infra-red spectrum of the o-ethylphenol is substantially identical with that reported in the literature. A reference spectrum was not available for the 2,6-diethylphenol. The spectrum did reveal that no meta or para ethylphenol was present.

Further good results are obtained when other phenols are reacted with ethylene or other organic compounds possessing carbon-to-carbon unsaturation. For example, o-chlorophenol can be reacted with ethylene in the presence of a phenoxide catalyst such as magnesium o-chlorophenoxide to form 2-ethyl-6-chlorophenol in good yield. Likewise, m-chlorophenol can be reacted with butene-1 in the presence of a phenoxide catalyst such as iron m-chlorophenoxide to give 2(2-butyl)-3-chlorophenol and 2(2-butyl)-5-chlorophenol. Likewise, 3,5-dimethylphenol can be reacted with allyl amine in the presence of a phenoxide catalyst such as aluminum 3,5-dimethylphenoxide to produce 2-(1-methyl-2-aminoethyl)-3,5-dimethylphenol. Also, naphthol-1 can be reacted with ethylene in the presence of a phenoxide catalyst such as aluminum naphthoxide to give 2-ethyl naphthol-1. Another example is the reaction of anthrol-1 with propylene in the presence of a phenoxide catalyst such as magnesium phenoxide to form 2-isopropyl anthrol-1. Other examples of products that can be formed by this process will be apparent to one skilled in the art.

EXAMPLE II

*Alkylation of phenol with propylene (aluminum phenoxide catalyst)*

The aluminum phenoxide catalyst was prepared in the manner similar to that given in Example I. A total of 490 parts of phenol, including that used in the preparation of the phenoxide catalyst, together with the catalyst was charged to the pressure resistant vessel as described in Example I. The reaction vessel was heated to 150° C. and pressurized with propylene. The temperature was then increased slowly and the start of the reaction was evidenced by a drop in the propylene pressure at 192° C. The reaction was carried out at a pressure of 21–35 atmospheres and at a temperature varying from 200 to 210° C. An amount of propylene equivalent to a drop in pressure of 61 atmospheres reacted with the phenol over a one-hour period. The product was hydrolyzed and fractionated to yield 223 parts of o-isopropylphenol (31.4 percent conversion, 52 percent yield), boiling at 209–210° C. and having a refractive index of 1.5275 $n_D^{20}$; and 105 parts of 2,6-di-isopropylphenol (11.3 percent conversion, 87.7 percent yield), boiling at 135.5–136.5° C. at a pressure of 30 millimeters of mercury melting at 18° C., and having a refractive index of 1.5134 $n_D^{20}$. Small amounts of phenyl isopropyl ether and o-isopropylphenyl isopropyl ether were also formed.

Analysis of the di-isopropylphenol product showed 80.8 percent C, 10.2 percent H (calculated 80.85 percent C, 10.18 percent H). The infra-red spectrum showed the phenolic band to be present.

EXAMPLE III

*Alkylation of phenol with propylene (magnesium phenoxide catalyst)*

Catalyst.—The magnesium phenoxide catalyst was prepared in a manner similar to that described for the preparation of aluminum phenoxide in Example I except that it was prepared directly in the pressure resistant vessel. A total of 600 parts of phenol and 6.5 parts of magnesium turnings were heated in this vessel to a temperature of 288° C. At this point, the temperature suddenly rose to 340° C. and the pressure increased in the reaction vessel from 9 to 16 atmospheres. When the pressure had ceased to rise the vessel was cooled to about 50° C., the liberated hydrogen released and the reaction vessel flushed with nitrogen. Following this, the vessel was closed tightly, heated to 150° C. and pressurized with propylene. Reaction occurred at 323° C. and was carried out at a pressure of 33–40 atmospheres. An uptake of an amount of propylene equivalent to a pressure drop of 30 atmospheres was observed over a 2.5 hour period. The product was hydrolyzed and fractionated to yield 120 parts of o-isopropylphenol (13.8 percent conversion, 72.8 percent yield), boiling at 209–209.5° C. with a refractive index of 1.5275 $n_D^{20}$. No other products were detected.

EXAMPLE IV

*Alkylation of phenol with cyclohexene (aluminum phenoxide catalyst)*

The catalyst was prepared in the pressure resistant vessel in a manner similar to that mentioned in the previous example by heating 300 parts of phenol and 2.25 parts of aluminum turnings to 162° C. At this point, reaction was evidenced by a sudden temperature rise to 211° C. and an increase in pressure from 1 to 5 atmospheres. After cooling to room temperature, 262 parts of cyclohexene were added to the pressure resistant vessel. Alkylation occurred at 244° C. with the temperature slowly rising to 259° C. The pressure dropped from 10 to 3 atmospheres during the reaction. The reaction mixture was hydrolyzed and fractionated to yield 236 parts of o-cyclohexylphenol (41.6 percent conversion, 60 percent yield), boiling at 170° C. at a pressure of 30 millimeters of mercury (literature, 148° C. at 10 millimeters of mercury), and melting at 55.5–57° C. (literature, 50–57° C.); 169.8 parts of 2,6-dicyclohexylphenol (20.2 percent conversion, 30 percent yield), boiling at 160° C. at a pressure of 1 millimeter of mercury and melting at 62–63.5° C. (literature, 67–65° C.). About 1 percent of p-cyclohexylphenol was also detected. A mixture of the above o-cyclohexylphenol with that of an authentic sample of the same compound melted at 56–57° C.

An infra-red spectrum of the 2,6-dicyclohexylphenol showed the hydroxy band to be present.

EXAMPLE V

*Alkylation of phenol with isobutylene (magnesium phenoxide catalyst)*

The catalyst was prepared in the pressure resistant vessel as in Example III by heating 470 parts of phenol with 6 parts of magnesium turnings to 288° C. At this point, the temperature suddenly rose to 306° C. and was accompanied by a rapid pressure rise, increasing from 8 to 15 atmospheres. After cooling and releasing the hydrogen, the reaction vessel was pressurized to 11 atmospheres with isobutylene at 100° C. The reaction vessel and its contents was then heated to 325° C. at which temperature a total pressure drop of 4 atmospheres (from 35 to 31 atmospheres) was observed over a 90 minute period. Upon hydrolyzation and fractionation, 66.3 parts of o-tert-butylphenol (9.2 percent conversion, 46 percent yield), was obtained, boiling at 120.5–121° C. at 30 millimeters pressure of mercury. The refractive index was 1.5237 $n_D^{20}$. No other products were isolated.

Further, good results are obtained when naphthol-1 is reacted with isobutylene in the presence of aluminum naphthoxide as a catalyst to give 2-tert-butyl naphthol-1, and also when 2-methoxy phenol is reacted with 2-methyl butene-1 in the presence of a phenoxide catalyst as, for example, zinc phenoxide to form 2-methoxy-6-(1,1-dimethyl propyl)phenol, or when anthrol-1 is reacted with 2-methyl pentene-1 in the presence of a phenoxide catalyst such as bismuth phenoxide to form 2(1,1-dimethyl butyl) anthrol-1.

EXAMPLE VI

*Alkylation of phenol with isobutylene (aluminum phenoxide catalyst)*

The catalyst for this run was prepared in a manner similar to that described in Example I above. A total of 600 parts of phenol were reacted with isobutylene at a temperature of 152–202° C. and at a pressure range of 4–15 atmospheres. An amount of isobutylene equivalent to a pressure drop of 67 atmospheres reacted with the phenol in a period of 80 minutes. The reaction mixture was hydrolyzed and fractionated to yield 496 parts of o-tert-butylphenol (51.8 percent conversion, 55.6 percent yield), which boiled at 119° C. at a pressure of 30 millimeters of mercury and had a refractive index of 1.5237 $n_D^{20}$; 164.7 parts of 2,6-di-tert-butylphenol (12.5 percent conversion, 13.4 percent yield), boiling at 144.5–145.5° C. at a pressure of 30 millimeters of mercury and melting at 36.5–37.2° C (literature, 39° C.); 197 parts of 2,4-di-tert-butylphenol (15 percent conversion, 16.1 percent yield), boiling at 152.3–154.5° C. at a pressure of 30 millimeters of mercury), and melting at 56–57° C. (literature, 56.5° C.). Small amounts of 2,4,6-tri-tert-butylphenol, 2,5-di-tert-butylphenol, and p-tert-butylphenol were also detected. An infra-red spectrum of the o-tert-butylphenol indicated a hydroxyl group was present.

Analysis of the 2,6-di-tert-butylphenol showed 81.4 percent C and 10.7 percent H (calculated for $C_{14}H_{22}O$, 81.49 percent C, 10.75 percent H). The carbon and hydrogen analysis of the 2,4,-di-tert-butylphenol showed 81.5 percent C and 10.7 percent H (calculated 81.49 percent C, 10.75 percent H).

EXAMPLE VII

*Low temperature alkylation of phenol with isobutylene (aluminum phenoxide catalyst)*

The aluminum phenoxide catalyst was prepared in a manner similar to that described in Example IV. A total of 565 parts of phenol together with 26 parts of toluene as a solvent were used in this reaction. The alkylation was carried out at 65–85° C. and at a pressure of 3–9 atmospheres. An amount of isobutylene equivalent to a pressure drop of 19 atmospheres was reacted at the above temperature and pressure. The reaction mixture was hydrolyzed and fractionated to yield 391.5 parts of o-tert-butylphenol (43 percent conversion, 59 percent yield); 64.6 parts of 2,6-di-tert-butylphenol, (5.2 percent conversion, 7.1 percent yield); 27 parts of 2,4-di-tert-butylphenol (2.2 percent conversion, 3 percent yield); 108 parts of tert-butylphenyl ether (12 percent conversion, 16 percent yield); and a small amount of p-tert-butylphenol.

Further, good results are obtained when o-hydroxydiphenyl is reacted with isobutylene in the presence of a phenoxide catalyst such as aluminum 2-phenylphenoxide to produce 2-phenyl-6-tert-butylphenol. Likewise, p-hydroxydiphenyl can be reacted with isobutylene in the presence of a phenoxide catalyst to give 2-tert-butyl-4-phenylphenol and 2,6-di-tert-butyl-4-phenylphenol. Also, the reaction between isobutylene and 4,4'-dihydroxy diphenyl, in the presence of a phenoxide catalyst as, for example, the aluminum phenoxide of 4,4'-dihydroxy diphenyl, produces such products as 4,4'-dihydroxy-3-tert-butyl-diphenyl, 4,4'-dihydroxy-3,3'-di-tert-butyl-diphenyl, 4,4'-dihydroxy-3,5-di-tert-butyl-diphenyl, 4,4'-dihydroxy-3,5'-di-tert-butyl-diphenyl, 4,4'-dihydroxy-3,3',5-tri-tert-butyl-diphenyl, 4,4'-dihydroxy-3,3',5,5'-tetra-tert-butyl-diphenyl. One of the factors that will determine which of the alkylated 4,4'-dihydroxy diphenyl isomers will predominate in the reaction products, is the ratio of olefin to the 4,4'-dihydroxy diphenyl used in the reaction mixture. For example, when 4,4'-dihydroxy diphenyl is reacted with an excess of isobutylene for a sufficient length of time, a high yield of the 4,4'-dihydroxy-3,3',5,5'-tetra-tert-butyl diphenyl is obtained.

The process of this invention can also be used to obtain other products, among which are; 2,4-dimethyl-6-tert-butyl phenol which can be obtained by the reaction of 2,4-dimethylphenol with isobutylene in the presence of a phenoxide catalyst such as aluminum 2,4-dimethyl phenoxide, 2,6-di-tert-butyl-4-methylphenol which can be obtained by the reaction of p-cresol with isobutylene in the presence of a phenoxide catalyst such as aluminum p-methyl phenoxide, 4(N-amylamino)-2-tert-butylphenol and 4(N-amylamino)-2,6-di-tert-butylphenol which can be obtained by the reaction of 4-(N-amylamino) phenol with isobutylene in the presence of a phenoxide catalyst such as aluminum 4-(N-amylamino)phenoxide, 4-(N,N-dibutylamino)-2-tert-butylphenol and 4(N,N-dibutylamino)-2,6-di-tert-butylphenol which can be obtained by the reaction of 4(N,N-dibutylamino)phenol with isobutylene in the presence of a phenoxide catalyst such as aluminum 4(N,N-dibutylamino)phenoxide, 2-tert-butyl-4-chlorophenol and 2,6-di-tert-butyl-4-chlorophenol which can be obtained by the reaction of p-chlorophenol with isobutylene in the presence of a phenoxide catalyst such as aluminum p-chlorophenoxide, 2-tert-butyl-4-bromophenol and 2,6-di-tert-butyl-4-bromophenol which can be obtained by the reaction of p-bromophenol with isobutylene in the presence of a phenoxide catalyst, 2-amino-4-halo-6-tert-butylphenol which can be obtained by the reaction of 2-amino-4-halophenol with isobutylene in the presence of a phenoxide catalyst such as aluminum 2-amino-4-halo-phenoxide, 2(N-isopropyl amino)-4-halo-6-tert-butylphenol which can be obtained by the reaction of 2(N-isopropylamino)-4-halo-phenol with isobutylene in the presence of a phenoxide catalyst 1,4-dihydroxy-2-tert-butyl benzene and 1,4-dihydroxy-2,5-di-tert-butyl benzene and also the tri- and tetra-substituted benzenes which can be obtained by the reaction of 1,4-dihydroxy benzene with isobutylene in the presence of a phenoxide catalyst such as aluminum phenoxide.

Other products which can be obtained by the use of other unsaturated compounds such as 2-methylbutene-1, 2-ethylbutene-1, 2-methylpentene-1, and the like, as well as other phenols such as 2-(4-hydroxyphenyl)phenol, 2(2-hydroxyphenyl)phenol, etc., will be apparent to one skilled in the art.

EXAMPLE VIII

*Alkylation of phenol with isobutylene (atmospheric pressure)*

The aluminum phenoxide catalyst was prepared in a manner similar to that described in Example I above. After the catalyst preparation was complete, isobutylene was passed through the stirred reaction mixture at 148–180° C. for a period of four hours. The mixture was hydrolyzed and fractionated to yield 212 parts of phenol and 66 parts of p-tert-butylphenol (14 percent conversion, 47.6 percent yield). The latter distilled at 232.8° C. at atmospheric pressure.

EXAMPLE IX

*Alkylation of phenol with diisobutylene (aluminum phenoxide catalyst)*

The catalyst was prepared in the same manner as that described in Example I above. A total of 234 parts of phenol was reacted with 252 parts of diisobutylene at a temperature of 280° C. in a pressure resistant vessel. The reaction time was 90 minutes, at the end of which period the reaction mass was hydrolyzed and fractionated to yield 55 parts of 2-(1,1,3,3-tetramethylbutyl)phenol (11.2 percent conversion, 17.2 percent yield), boiling at 157–158.5° C. at a pressure of 30 millimeters of mercury and having a melting point of 42–44° C.; 123 parts of 4-(1,1,3,3-tetramethylbutyl)phenol (25.1 percent conversion, 38.6 percent yield), boiling at 175° C. at a pressure of 30 millimeters of mercury and melting at 85–86° C.; 47.2 parts of di-(1,1,3,3-tetramethylbutyl) phenol (6.2 percent conversion, 9.2 percent yield), boiling at 216.5–217.5° C. at a pressure of 30 millimeters of mercury. The 2-(1,1,3,3-tetramethylbutyl)phenol had a refractive index of 1.5134 $n_D^{20}$ (super cooled liquid). The carbon and hydrogen analysis showed 81.4 percent C, and 10.7 percent H, (calculated 81.49 percent C, 10.75 percent H).

The carbon and hydrogen analysis for the di-(1,1,3,3-tetramethylbutyl)phenol showed 82.8 percent C, and 12 percent H, (calculated 83 percent C, 11.9 percent H). An infra-red spectrum of the di-(1,1,3,3-tetramethylbutyl) phenol indicated that the phenolic hydroxyl group was present.

Further, good results are obtained when 2,4-dimethyl phenol is reacted with diisobutylene in the presence of a phenoxide catalyst such as aluminum 2,4-dimethyl phenoxide to produce 2,4-dimethyl-6-(1,1,3,3-tetramethyl butyl)phenol. Likewise, p-cresol can be reacted with diisobutylene in the presence of a phenoxide catalyst such as aluminum p-methyl phenoxide to give 4-methyl-2,6-di-(1,1,3,3-tetramethyl butyl) phenol. In like manner, 4(N-butylamino)phenol can be reacted with diisobutylene in the presence of a phenoxide catalyst to form 4(N-butylamino)-2(1,1,3,3-tetramethyl butyl)phenol and 4(N-butylamino)-2,6-di(1,1,3,3 - tetramethyl butyl)phenol. Also, diisobutylene can be reacted with a p-halo phenol to form 2(1,1,3,3-tetramethyl butyl)-4-halo phenol and 4-halo-2,6-di(1,1,3,3-tetramethylbutyl)phenol. Likewise, diisobutylene can be reacted with 4,4'-dihydroxy diphenyl in the presence of a phenoxide catalyst such as the aluminum phenoxide of phenol or of the 4,4-dihydroxy diphenyl to give products containing 1, 2, 3 or 4 tert-octyl groups on the diphenyl nucleus as, for example, 4,4'-dihydroxy-3,5'-di(1,1,3,3 - tetramethylbutyl)diphenyl and 4,4' - dihydroxy - 3,3',5,5'-(1,1,3,3-tetramethylbutyl)diphenyl. Other possible products that can be obtained will be apparent to one skilled in the art.

EXAMPLE X

*Alkylation of phenol with decene-1 (aluminum phenoxide catalyst)*

The catalyst was prepared in a manner similar to that described in Example IV by heating 300 parts of phenol with 4.59 parts of aluminum turnings to 170° C. To the mixture of phenol and aluminum phenoxide was added 167 parts of decene-1. The reactants were brought up to a temperature of 300° C. over a 90 minute period. The reaction mixture was then cooled, hydrolyzed and fractionated. The products obtained were 138 parts (49% conversion), of ortho (1-methylnonyl)phenol and 24 parts (5.8% conversion) of 2,6-di(1-methylnonyl)-phenol.

The o-(1-methylnonyl)phenol distilled at 198–200.5° C. at 30 mm. pressure of mercury and had a refractive index of 1.5010 $n_D^{20}$. The carbon and hydrogen analysis showed 82.1% C and 11.3% H (calculated 81.99% C, 11.18% H). An infra-red spectrum of the compound showed the phenolic band to be present.

The 2,6-di(1-methylnonyl)phenol boiled at 205–208° C. at a pressure of 2 mm. of mercury and had a refractive index of 1.4900 $n_D^{20}$. The carbon and hydrogen analysis showed 83.6% C and 11.8% H (calculated 83.3% C, 12.3% H). The infra-red analysis showed that the phenolic band was present.

Both the 2(1-methylnonyl)phenol and the 2,6-di-(1-methylnonyl)phenol are new compositions of matter. They are found to be unexpectedly good insecticides as well as fungicides, miticides and germicides. In addition, these two compounds are found to be very good plasticizers and antioxidants for hydrocarbon fuels and lubricating oils.

EXAMPLE XI

2(1,1-dimethyl-2-methoxyethyl)phenyl

The catalyst was prepared in a manner similar to that described in Example IV by reacting 300 parts of phenol with 4.59 parts of aluminum turnings to 170° C.

To the mixture of phenol and aluminum phenoxide is added 210 parts of methallyl methyl ether. The mixture is heated and reaction allowed to proceed in the temperature range of 100 to 125° C. over a 90 minute period. The reaction mixture is then cooled, hydrolyzed and fractionated. A high yield of 2(1,1-dimethyl-2-methoxyethyl)phenol is obtained.

Good results are also obtained when naphthol-1 is reacted with methallyl ethyl ether in the presence of a phenoxide catalyst such as, for example, magnesium naphthoxide, to form 2(1,1-dimethyl-2-ethoxy ethyl)-naphthol. Likewise, when 3-chlorophenol is reacted with allyl amine in the presence of a phenoxide catalyst such as aluminum 3-chlorophenoxide, the products, 2(1-methyl-2-amino ethyl)3-chlorophenol and 2(1-methyl-2-amino ethyl)5-chlorophenol are formed. Other products that can be obtained by practicing this invention will be apparent to one skilled in the art.

In general, the process of this invention can be carried out at temperatures ranging from 0 to about 500° C. and at pressures of from less than 1 atmosphere to about 3000 atmospheres or higher. The optimum temperature and pressure of a particular reaction depends on the reagents that are being reacted and the catalyst or catalysts used. For example, when the unsaturated compound which is to be used for introducing a group onto the aromatic ring of a phenol has at least one hydrogen atom on each of the doubly bonded carbon atoms, we prefer to use temperatures ranging from about 150° C. to about 500° C. and pressures in the range of 1–3000 atmospheres. When alkylating phenols, such as hydroxy-benzenes and hydroxy naphthalenes, with acetylenic and olefinic hydrocarbons such as acetylene, ethylene, propylene, butylene, hexene, decene, cetene, eicosene, and the like, we especially prefer reaction temperatures of from about 150° C. to about 300° C. and reaction pressures of from less than one atmosphere to about 500 atmospheres. However, higher temperatures and pressures can be used. Illustrative reactions are Examples I, II, III, IV and X. From these it is seen that alkylation of phenol with ethylene requires, for best results, a higher pressure and temperature than does alkylation of phenol with propylene, while alkylation with a hydrocarbon such as decene can be conducted at the vapor pressure of system as described in Example X.

Another situation arises when at least one of the doubly-bonded carbon atoms in the unsaturated compound which is used has no hydrogen attached thereto. We find that in this case temperatures ranging from 0 to 500° C. and pressures of from 1 to 3000 atmospheres can be employed. This is illustrated by a series of reactions in which phenol is alkylated with isobutylene as described in Examples VI–VIII, both inclusive. Here we see that as the temperature is increased, there should be a corresponding increase in the pressure in order to obtain a predominantly ortho substituted product, for, otherwise, at high temperature and low pressure, a larger amount of para substituted product is obtained. However, except for the limitations that have been noted above, we obtain a good yield of ortho alkyl phenols under any of the general conditions of pressure and temperature combinations within the broad limits of which our process can be carried out as discussed hereinabove. The problem of alkylating with a compound such as isobutylene does not present itself in the case where the phenol employed in the reaction is one which already has a substituent in the para position. A preferred embodiment when reacting a phenol such as hydroxy benzene with an acetylenic or olefinic hydrocarbon in which at least one of the doubly or triply bonded carbon atoms has no hydrogen attached thereto, as for example, isobutylene, is to conduct the reaction at temperatures up to about 300° C. and pressures up to about 500 atmospheres, although higher temperatures and pressures can also be used.

From the above discussion and the examples cited, it is seen that optimum temperature and pressure for a particular set of reagents and catalysts can be determined by one skilled in the art simply by following the teachings of this invention.

It was stated above that the phenols that can be used in carrying out the process of this invention can be mono- or polynuclear and mono- or polyhydroxy, and that they may or may not have other substituents on the ring, the requirement being that there be a position ortho to the hydroxy group available for substitution. Non-limiting examples of such phenols are phenol, o-cresol, m-cresol, p-cresol, o-chlorophenol, m-chlorophenol, p-chlorophenol, 2,5-dichlorophenol, p-bromophenol, o-nitrophenol, m-nitrophenol, p-nitrophenol, o-cyclohexylphenol, p-cyclohexylphenol, catechol, resorcinol, hydroquinone, pyrogallol, hydroxyhydroquinone, phloroglucinol, o-aminophenol, m-aminophenol, p-aminophenol, guaiacol, anol, eugenol, isoeugenol, saligenin, carvacrol, thymol, o-hydroxyacetophenone, p-hydroxyacetophenone, o-hydroxydiphenyl, p-hydroxydiphenyl, m-hydroxyethylbenzoate, p-hydroxymethylbenzoate, naphthol-1, 3-chloronaphthol-1, 6-bromonaphthol-1, 3-nitronaphthol-1, 3-methylnaphthol-1, 8-aminonaphthol-1, anthrol-1, 9-chloroanthrol-1, 3-bromoanthrol-1, 9-aminoanthrol-1, phenanthrol, ar-2-tetralol, and the like.

The unsaturated compounds that can be used to introduce organic groups onto the aromatic nucleus are acetylene and substituted acetylenes such as methyl acetylene, ethyl acetylene, and the like; mono- and non-conjugated polyolefins such as ethylene, propylene, butylene, isobutylene, amylene, isoamylene, 2-methylamylene, hexene, heptene, heptadienes, octene, di-isobutylene, decene, alloocimene, dodecene, hexadecene, octadecene, eicosene, styrene, 2-phenylpropene-1, 3-phenylpropene-1, 2-phenylbutene-1, 3-phenylbutene-1, etc.

Mixed olefins such as are obtained by polymerizing propylenes or butylenes by known methods, having from about 8 to about 12 carbon atoms, can also be used as well as mixtures of other olefins. In addition, certain substituted olefins, (unsaturated organic compounds), can be used. Non-limiting examples of such substituted olefins are: vinylchloride, propargyl ethyl ether, vinyl ethyl ether, divinyl ether, methallyl ethyl ether, dimethallyl ether, methallyl phenyl ether, dihydropyran, propenyl acetate, methyl-β-methyl crotonate, pentene-4-ol-1, 4-methylpentene-4-ol-2, hexene-5-ol-1, decene-9-ol-1, dodecene-11-ol-1, cetene-15-ol-1, eicosene-19-ol-1, methyloleate, ethyloleate, ethyllinoleate, methallyamine, crotonylamine, 5-aminopentene-1, and the like.

Non-limiting examples of products that can be obtained by our process in addition to those given hereinabove are: 2-hydroxy styrene and 1,1-bis-(2-hydroxyphenyl)ethane, obtained by the reaction of phenol with acetylene in the presence of a phenoxide catalyst such as aluminum phenoxide; 3-methyl-2-ethylphenol, 3-methyl-6-ethylphenol and 3-methyl-2,6-diethylphenol, obtained by the reaction of 3-methylphenol with ethylene in the presence of a phenoxide catalyst such as magnesium 3-methyl phenoxide; 3-methyl-2-isopropylphenol, 3 - methyl - 6-isopropylphenol, and 3-methyl-2,6-diisopropylphenol obtained by the reaction of 3-methylphenol with propylene in the presence of a phenoxide catalyst such as, for example, zinc 3-methyl phenoxide; 2-ethyl-6-tert-butylphenol, obtained by the reaction of phenol with ethylene in the presence of a phenoxide catalyst and then reacting the 2-ethylphenol obtained in this manner with isobutylene in the presence of a phenoxide catalyst such as iron-2-ethyl phenoxide; 2-isopropyl-6-tert-butylphenol obtained by the reaction of phenol with propylene in the presence of a phenoxide catalyst to produce 2-isoprophenol and then reacting that product with isobutylene in the presence of a phenoxide catalyst such as antimony 2-isopropyl phenoxide; 2(2-eicosyl)phenol obtained by the reaction of phenol with eicosene-1 in the presence of a phenoxide catalyst; 2-isopropylnaphthol-1 obtained by the reaction of naphthol with propylene in the presence of a phenoxide catalyst such as magnesium phenoxide; 2-decylnaphthol-1 obtained by the reaction of naphthol-1 with decene-1 in the presence of a phenoxide cataylst such as aluminum naphthoxide; 2-tert-butylanthrol-1 obtained by the reaction of anthrol-1 with isobutylene in the presence of a phenoxide catalyst; 3-chloro-2-isopropylphenol, 3 - chloro-5-isopropylphenol and 3-chloro-2,6-di-isopropylphenol obtained by the reaction of 3-chlorophenol with propylene in the presence of a phenoxide catalyst such as, for example, magnesium phenoxide; 2(1-methyl-3-hydroxy ethyl)phenol obtained by the reaction of phenol with pentene-4-ol-1 in the presence of a phenoxide catalyst such as aluminum phenoxide; 2(1,1-dimethyl-2-ethoxyethyl)phenol obtained by the reaction of phenol with methallyl ethyl ether in the presence of a phenoxide catalyst such as magnesium phenoxide; di-2(2-methyl-2-hydroxy phenyl)propyl ether obtained by the reaction of phenol with di-methallyl ether in the presence of a phenoxide catalyst; 2(β-methyl-β-hydroxylphenyl)butyric acid, methyl ester, obtained by the reaction of phenol with methyl-β-methyl crotonate in the presence of a phenoxide catalyst; 2(1,1-dimethyl-2-aminoethyl)phenol obtained by the reaction of phenol with methallyl amine in the presence of a phenoxide catalyst;

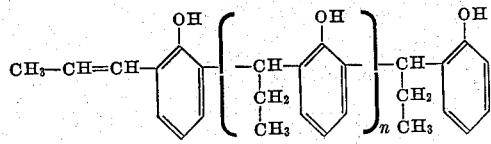

obtained by reacting anol in the presence of a phenoxide catalyst such as aluminum anolate.

In carrying out the process of our invention the reagents can often be reacted without the presence of any diluent. However, it is within the scope of our invention to conduct the process of this invention with either or both of our reactants dissolved in one or more solvents or a mixture of solvents. The solvent can be either liquid, solid or gaseous, depending primarily on the state of the reactant which is to be diluted at the time of introduction into the reaction vessel or zone. The solvent should be one which is inert to the components including the catalyst under the conditions of the reaction. Paraffins, cycloparaffins, aromatic hydrocarbons, and inert gases, and the like, are examples of suitable solvent types which may be compatible with one or more of the reagents that can be used in practicing our invention. Specific examples of solvents include n-octane, isoctane, cyclohexane, benzene, alkyl benzenes, hydrogen, nitrogen, argon, and the like. Also, one of the reacting components can be employed as a solvent, as for example, an excess of phenol may serve as a suitable diluent.

In the commercial production of the compounds of our invention it is particularly attractive to conduct the process in a continuous manner. This can be done by a variety of techniques such as passing the reactants together with the catalyst, either substantially pure or admixed with an inert carrier, through a reaction zone. The product stream can be hydrolyzed and purified by distillation in a continuous fractionation column. The continuous method for the production of the compounds of our invention can be carried out either in a "once through" manner or with recycling of reactants and products. In continuous and batch modifications of our invention, the reactants can be diluted with inert gases such as propane, ethane, methane, nitrogen, helium, neon and the like, as well as with other gaseous, liquid or solid diluents or solvents of the kind described hereinabove.

The compounds that can be made by our process have a variety of uses such as monomers for phenolic resins, detergent intermediates, germicides, polymerization inhibitors, anti-oxidants, intermediates for dye syntheses and the like. As specific examples, o-tert-amylphenol is an outstanding ingredient for marine antifouling paints and as an antiskinning agent for paints and varnishes, and 2,6-di-tert-butylphenol and 2,6-diisopropylphenol are very good antioxidants, to mention but a few of the many useful phenols possessing groups in the ortho positions.

We claim:
1. A process for selectively introducing a hydrocarbon group onto a nuclear ring of a phenol, said process comprising reacting a phenol bearing at least one ortho-hydrogen atom with an unsaturated hydrocarbon in the presence of, as a catalyst, a phenoxide of an element selected from the group consisting of aluminum and magnesium, said process being carried out at a temperature of from 0 to 500° C.

2. The process of claim 1 wherein said catalyst is an aluminum phenoxide.

3. The process of claim 1 wherein said phenoxide is a magnesium phenoxide.

4. The process of claim 1 wherein said phenoxide is derived from said phenol.

5. The process of claim 1 wherein said hydrocarbon is a monoolefin and said catalyst is an aluminum phenoxide.

6. The process of claim 1 wherein up to 30 per cent of said phenol is present in the form of said phenoxide.

7. The process of claim 1 wherein said hydrocarbon is an olefin.

8. The process of claim 1 wherein said olefin is a monoolefin.

9. The process of claim 1 wherein said phenoxide is aluminum phenoxide, said hydrocarbon is isobutylene and said phenol is ortho-cresol.

10. The process of claim 9 wherein the temperature does not exceed 300° C. and the isobutylene pressure is from about 1 to about 500 atmospheres.

11. The process of claim 1 wherein said phenoxide is aluminum phenoxide, said hydrocarbon is propylene and said phenol is ortho-cresol.

12. A process of claim 11 wherein the temperature does not exceed 300° C. and the propylene pressure is from about 1 to about 500 atmospheres.

13. A process of the preparation of 2,6-di-tert-butyl-phenol which comprises reacting phenol with isobutylene in the presence of aluminum phenoxide as a catalyst at a temperature of 0 to 500° C.

14. The process of claim 13 wherein the temperature does not exceed 202° C. and the isobutylene pressure is from about 4 to 15 atmospheres.

15. A process for the preparation of 2,6-diisopropylphenol which comprises reacting phenol with propylene in the presence of aluminum phenoxide as a catalyst at a temperature of 0 to 500° C.

16. The process of claim 15 wherein the temperature does not exceed 210° C. and the propylene pressure is from 21 to 35 atmospheres.

17. A process for introducing a hydrocarbon group onto a nuclear ring of a phenol, said process comprising reacting a phenol bearing at least one ortho-hydrogen atom with an olefinic hydrocarbon in the presence of, as a catalyst, a phenoxide of an element selected from the group consisting of aluminum and magnesium, said process being carried out at a temperature of from 250° C. to 400° C.

18. The process for selectively introducing a hydrocarbon group into a nuclear ring of a phenol, said process comprising (1) reacting a phenol bearing at least one ortho hydrogen atom with a monoolefin in the presence of an aluminum phenoxide as a catalyst, said process being carried out at a temperature of from 0 to 500° C., (2) hydrolyzing the product from (1) and (3) isolating an ortho substituted phenol by fractional distillation.

References Cited in the file of this patent
UNITED STATES PATENTS

| | | |
|---|---|---|
| 1,959,927 | Reppe | May 22, 1934 |
| 2,191,499 | Reiff | Feb. 27, 1940 |
| 2,202,877 | Stevens et al. | June 4, 1940 |
| 2,256,612 | Ellis | Sept. 23, 1941 |
| 2,275,312 | Tinker et al. | Mar. 3, 1942 |
| 2,409,274 | Hanford et al. | Oct. 15, 1946 |
| 2,615,050 | Insinger | Oct. 21, 1952 |
| 2,695,920 | Wilkinson et al. | Nov. 30, 1954 |

FOREIGN PATENTS

| | | |
|---|---|---|
| 412,169 | Germany | Apr. 15, 1925 |

OTHER REFERENCES

Claison: Chem. Abstracts, vol. 13 (1919), page 2340 (1 page).

Sowa et al.: Jour. Amer. Chem. Soc., vol. 55 (1933), pages 3402–3 (2 pages).

Vavon et al.: Chem. Abstracts, vol. 31 (1937), col. 8515 (1 page).

"Organic Reactions," vol. III (1946), pages 14, 15 (2 pages).

UNITED STATES PATENT OFFICE

CERTIFICATE OF CORRECTION

Patent No. 2,831,898                        April 22, 1958

George G. Ecke et al.

It is hereby certified that error appears in the printed specification of the above numbered patent requiring correction and that the said Letters Patent should read as corrected below.

Column 14, line 60, claim 8, for the claim reference numeral "1" read -- 7 --.

Signed and sealed this 19th day of August 1958.

(SEAL)
Attest:

KARL H. AXLINE
Attesting Officer

ROBERT C. WATSON
Commissioner of Patents